United States Patent [19]

Murphree, Jr.

[11] Patent Number: 4,717,991
[45] Date of Patent: Jan. 5, 1988

[54] AIRPORT BEACON LIGHT

[76] Inventor: Leo Murphree, Jr., P.O. Box 1997, Greenwood, Miss. 38930

[21] Appl. No.: 946,657

[22] Filed: Dec. 29, 1986

Related U.S. Application Data

[63] Continuation of Ser. No. 734,462, May 15, 1985, abandoned.

[51] Int. Cl.$^4$ .............................................. F21V 21/30
[52] U.S. Cl. ......................................... 362/35; 340/50; 340/331; 362/272; 362/274; 362/294
[58] Field of Search .................. 362/35, 272, 294, 274; 340/50, 84, 331, 981, 90

[56] References Cited

U.S. PATENT DOCUMENTS

| | | | |
|---|---|---|---|
| 2,332,383 | 10/1943 | Kost | 362/35 |
| 2,823,366 | 2/1958 | Schmitz | 362/35 |
| 2,916,610 | 12/1959 | Crossley | 362/35 |
| 3,013,145 | 12/1961 | Trippe | 362/35 |
| 3,886,350 | 5/1975 | Katsukura et al. | 340/50 |
| 4,153,926 | 5/1979 | Hurt | 362/35 |
| 4,205,366 | 5/1980 | Bleiweiss et al. | 362/35 |
| 4,353,110 | 10/1982 | Ellis | 362/35 |
| 4,384,271 | 5/1983 | Visser | 340/84 |

Primary Examiner—James C. Yeung
Attorney, Agent, or Firm—Walker & McKenzie

[57] ABSTRACT

An airport beacon light for producing a bright, color coded signal as a visual aid for airplane pilots. The light includes a metal halide lamp, a housing having a primary color coding lens, a lamp holder for accurately holding the lamp within the housing adjacent the lens, a color correcting auxiliary lens mounted adjacent the primary color coding lens for correcting the color of the light produced by the lamp through the primary lens.

4 Claims, 7 Drawing Figures

AIRPORT BEACON LIGHT

This application is a continuation of application Ser. No. 734,462, filed May 15, 1985, abandoned.

BACKGROUND OF THE INVENTION

1. Field of the Invention

The present invention relates in general to airport beacon lights for producing a bright, color coded signal as a visual aid for airplane pilots in locating airports during night flights, etc.

2. Description of the Prior Art

Airports typically include rotating signal or double head beacon lights which sweep color coded beams of light through a complete revolution as an aid to aerial navigation. Such beacons typically include one or more 1,000 watt incandescent lamps. Such 1,000 watt incandescent lamps have a life expectancy of about 500 hours, which is approximately 42 days based on a 12 hour per day operation. Pennow, U.S. Pat. No. 2,462,222 discloses a beacon light which provides a rotating beacon without exposed rotatable or moving parts. Edgerton, U.S. Pat. No. 2,449,063 discloses an electric system including a plurality of lamps arranged and electrically coupled so as to flash on and off sequentially to produce a beam that appears to rotate but without any moving parts. In addition to the above-referenced patents, a preliminary patentability search directed in classes 315, 340 and 362 disclosed the following patents: Crossley, U.S. Pat. No. 2,595,770; Schmitz, U.S. Pat. No. 2,823,366; and Bleiweiss, U.S. Pat. No. 4,205,366. None of the above patents disclose or suggest the present invention.

SUMMARY OF THE INVENTION

The present invention is directed toward improving upon prior airport beacon lights. The concept of the present invention is to provide an airport beacon light with a calibrated, adjustable lamp holder means for holding a metal halide lamp and a color coded auxiliary lens member for coding the color of the light produced by the lamp through the lens.

The airport beacon light of the present invention comprises, in combination, a metal halide lamp; a hollow housing member including a lens; a lamp holder means positioned within the interior of the housing member for holding the lamp in a location adjacent the lens; the lamp holder means including a base member fixedly attached to the housing member within the interior thereof adjacent the lens and including a lamp socket member for removably holding the lamp; and a circuit means for electrically coupling the lamp to a source of electrical energy. The lamp socket member is preferably adjustable relative to the base member for allowing the position of the lamp relative to the lens to be adjusted. Preferably, a color correcting means is mounted adjacent the lens for correcting the color of the light produced by the lamp through the lens.

An objective of the present invention is to provide an airport beacon light for a retrofit for existing airport beacon lights that will save electrical energy, lessen the maintenance on such lights, provide a brighter, clearer visual beam for pilots trying to locate an airport, and a continued dollar savings for the airport for the duration of the operation of the light.

The 1,000 watt incandescent lamp typically used to power airport rotating beacon lights has a current list price of approximately $78.00 and a life expectancy of 500 hours or approximately 42 days based on a 12 hour per day operation. The 400 watt metal halide lamp used with the present invention currently retails for approximately $55.00 and has a life expectancy of 20,000 hours or approximately 4.47 years based on a 12 hour per day operation. Additionally, the 400 watt metal halide lamp uses approximately 60% less electrical energy and the lumen output is approximately 30% greater than the 1,000 watt incandescent lamp.

An additional objective of the present invention is to provide additional dollar savings by switching off all of the obstruction lights either mounted on the beacon itself or remotely mounted on the beam support tower anytime the 400 watt metal halide lamp is operating.

DESCRIPTION OF THE PREFERRED EMBODIMENT

The airport beacon light 11 of the present invention is for use with a source 13 of electrical energy such as the typical alternating current source of an airport to produce a bright, color coded signal as a visual aid for airplane pilots and the like. The light 13 is typically mounted on a beacon support tower 15 or the like of any construction now apparent to those skilled in the art.

The light 11 includes a metal halide lamp 17. The lamp 17 is preferably a 400 watt unit having a life expectancy of 20,000 hours. The General Electric Company, Lightings Systems Dept., Hendersonville N.C., manufactures such a lamp as model number MVR 400 U.

Figure 1:
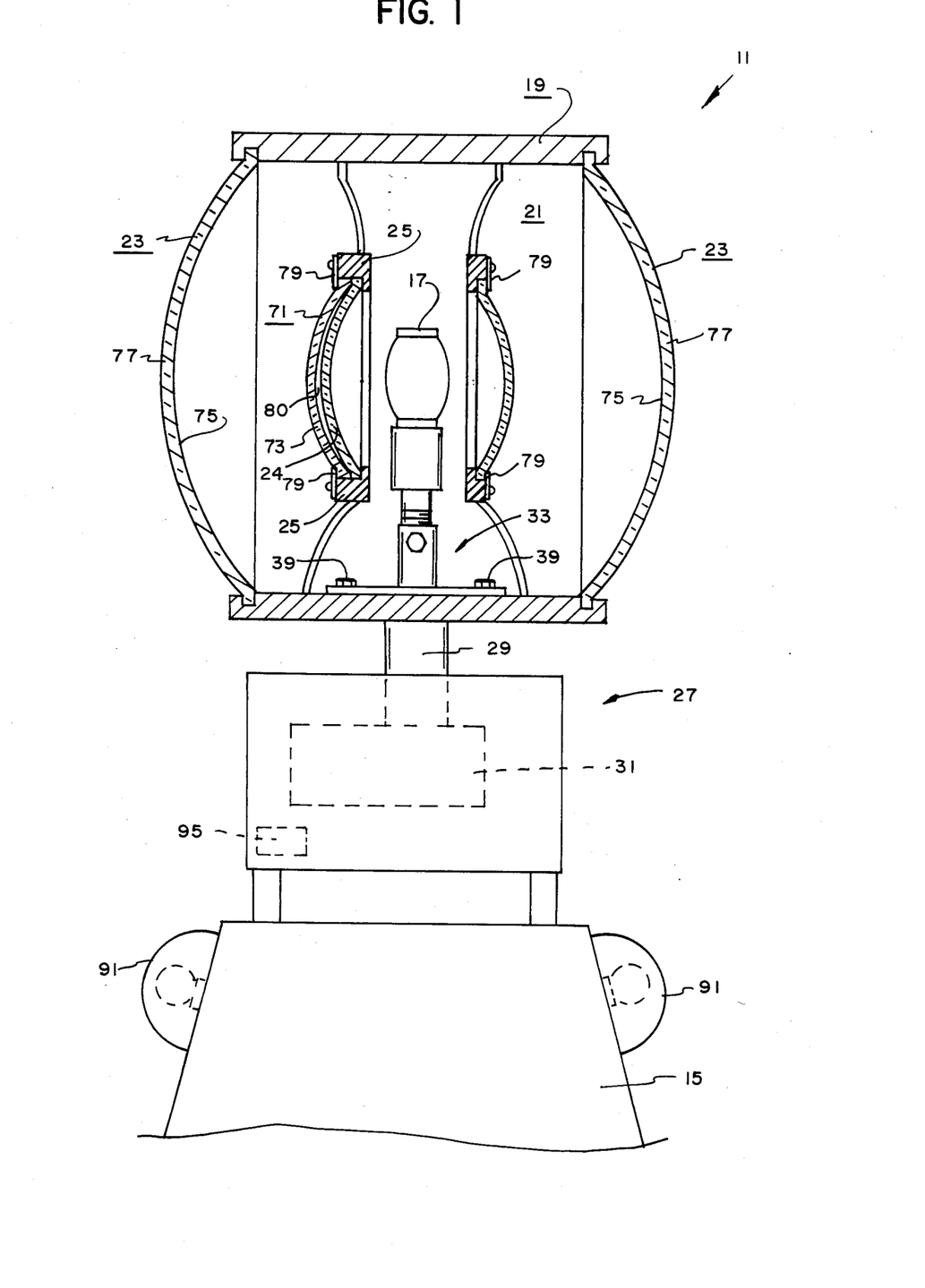
FIG. 1 is a somewhat diagrammatic view of a single head, double beacon light incorporating the present invention and with portions thereof broken away for clarity.
Figure 2:
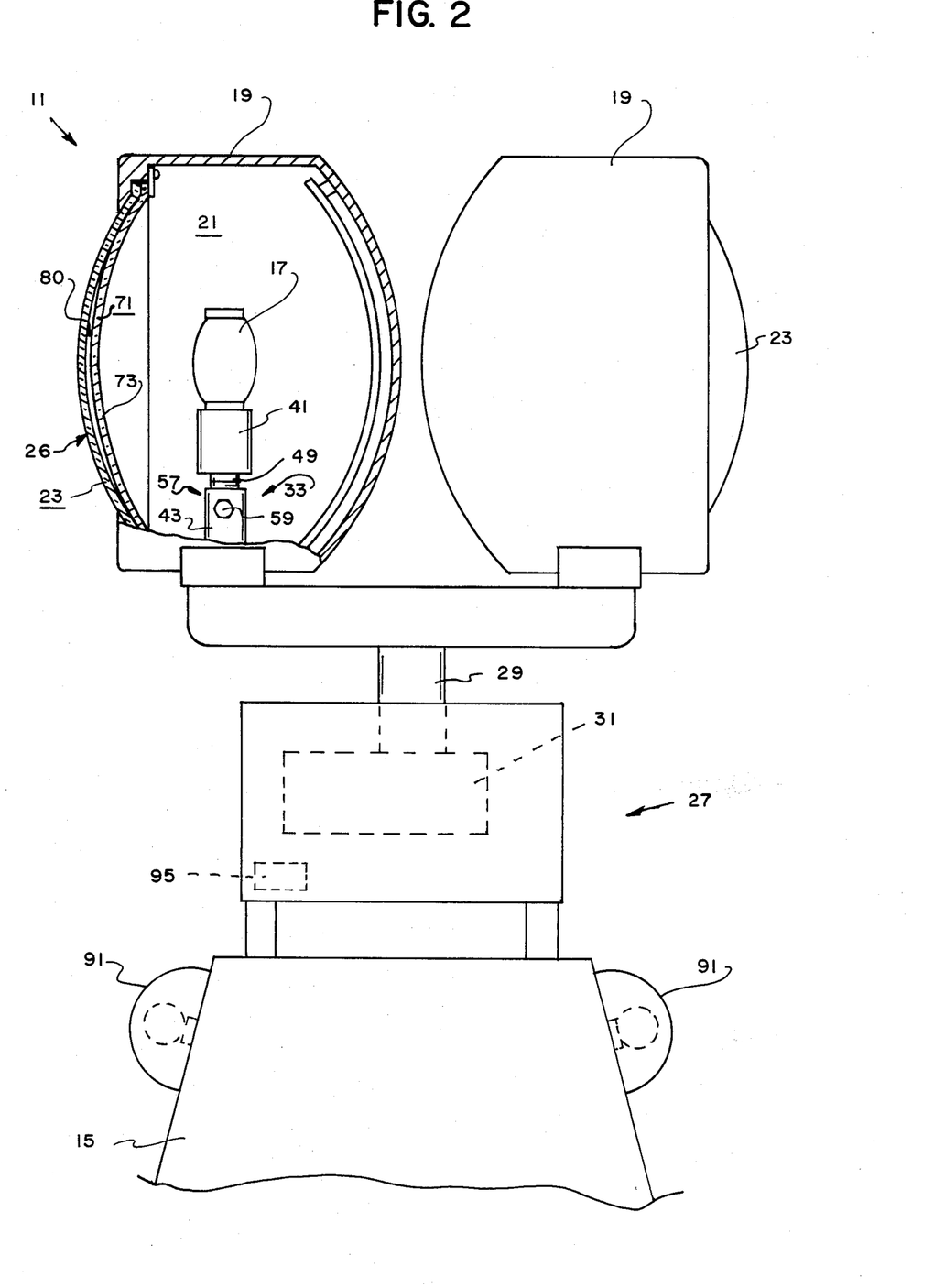
FIG. 2 is a somewhat diagrammatic view of a double head, double beacon light incorporating the present invention and with portions thereof broken away for clarity.

The light 11 includes a housing member 19 having a hollow interior 21 and including a lens 23 and associated structure to define an optical system. The specific construction of the housing member 19 may vary as will be apparent to those skilled in the art. Thus, the housing member 19 typically consists of a metal body having one or more access doors into the interior 21 thereof and may include various components such as magnifiers, reflectors, doublets and the like that combine with the lens 23 to form the optic system as will be apparent to those skilled in the art. The housing member 19 may consist of a single head, double beacon type unit such as a typical 36 inch rotating beacon as shown in FIG. 1 for producing two light beams or signals directed opposite one another, may consist of a double head, double beam type unit such as a typical 24 inch double head rotating beacon as shown in FIG. 2 for producing two light beams or signals directed opposite one another, or may consist of a single head, single beam type unit such as a typical 24 inch single head rotating beacon (not shown) well known to those skilled in the art which produces a single light beacon or signal. The system of the housing member 19 typically includes a color coding means for coding the color of the light produced. Thus, one of the doublets of the typical 36 inch rotating beacon may be constructed as a color coding doublet lens 24 (see FIGS. 1 and 6) out of green glass and mounted within the interior 21 of the housing member 19 by way of a spider ring 25 or the like to produce a green coded light. Also, the lens 23 of one head of the typical 24 inch rotating beacon may be constructed as a color coding lens 26 (see FIGS. 2 and 5) out of green glass to produce a green coded light.

The housing member 19 is preferably rotatably mounted to the support platform or tower 15 to produce a rotating light beam or signal. Thus, the light 11 typically includes a drive means 27 attached to the housing member 19 for rotating the housing member 19 about a generally vertical axis. The drive means 27 may be constructed in various manners now apparent to those skilled in the art. Thus, for example, the drive means 27 may include a drive shaft 29 attached to the housing member 19, and a motor means 31 coupled to the drive shaft either directly or through a gear transfer mechanism for rotating the drive shaft 29. The housing or other support structure of the motor means 31 may, in turn, be fixedly mounted to the top of the support tower 15 as will now be apparent to those skilled in the art.

Figure 3:
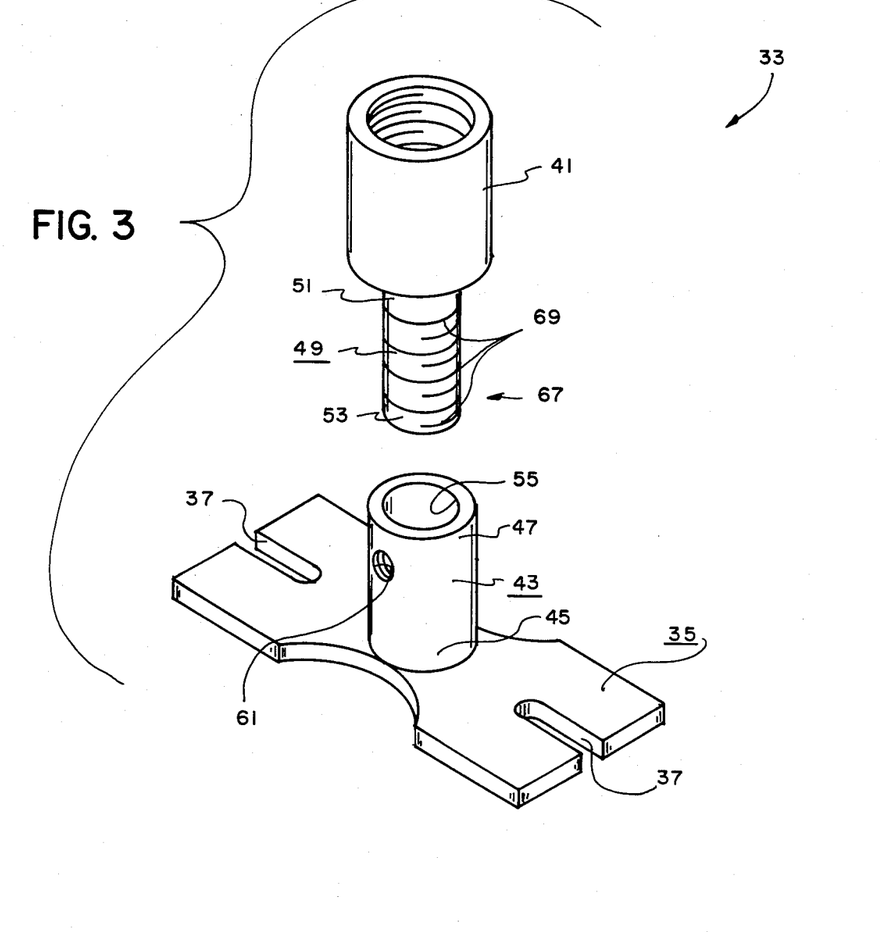
FIG. 3 is an exploded perspective veiw of a lamp holder means of the airport beacon light of the present invention.

The light 11 includes a lamp holder means 33 positioned within the interior 21 of the housing member 19 for holding the lamp 17 in a location adjacent the lens 23 (see, in general, FIGS. 1 and 2). The lamp holder means 33 includes a base member 35 for being fixedly attached to the housing member 19 within the interior 21 thereof. The base member 35 may consist of a substantially rectangular metal plate having an aperture or slot 37 through the opposite ends thereof (see, in general, FIG. 3) for allowing the base member 35 to be fixedly attached to the housing member 19 within the interior 21 thereof by way of bolts 39 or the like. The specific construction and method of attachment of the base member 35 may vary depending on the specific construction of the housing member 19. The lamp holder means 33 also includes a lamp socket member 41 for removably holding the lamp 17. The specific construction of the lamp socket member 41 will be apparent to those skilled in the art. The lamp socket member 41 may be of any typical type now apparent to those skilled in the art such as model number 8694-4 manufactured by Leviton Mfg. Co., Inc. Little Neck, N.Y. The lamp socket member 41 is adjustable relative to the base member 35 for allowing the position of the lamp 17 relative to the lens 23 and associated structure to be adjusted. More specifically, the lamp holder means 33 preferably includes first extension member 43 having a first end 45 attached to the base member 35 and having a second end 47, and includes a second extension member 49 having a first end 51 attached to the lamp socket member 41 and having a second end 53. The first and second extension members 43, 49 are movably attached to one another in a telescopic-like manner to allow the lamp socket member 41 to be moved toward and away from the base member 35 thereby allowing the position of the lamp 17 within the interior 21 of the housing member 19 to be adjusted. The second end 47 of the first extension member 43 is preferably provided with a cavity 55 and the second end 53 of the second extension member 49 is preferably shaped and sized so as to slidably fit within the cavity 55 to thereby allow the first and second extension members 43, 49 to be slidably moved relative to one another. The first and second extension members 43, 49 may consist of elongated lengths of metal pipe welded or otherwise fixedly attached to the respective base member 35 and lamp socket member 41.

Figure 4:
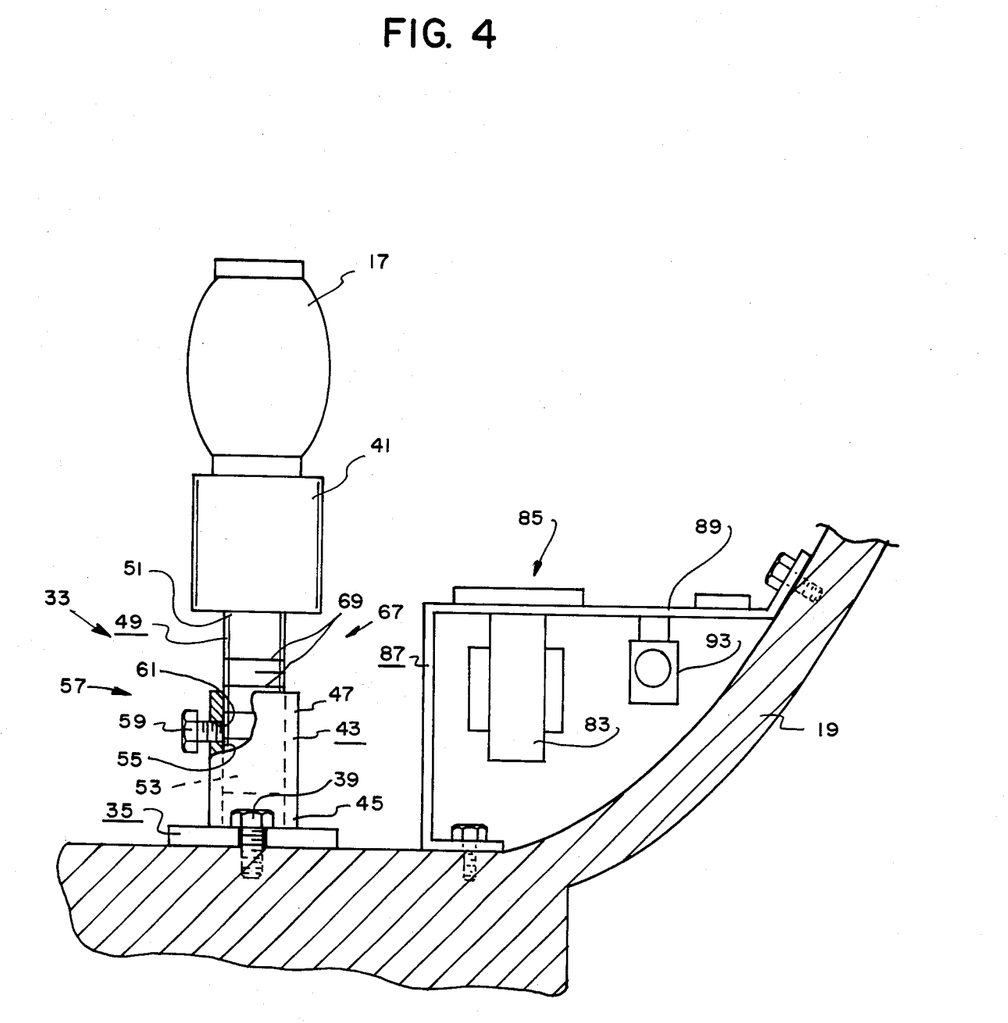
FIG. 4 is an enlarged sectional view of a portion of the beacon light of FIG. 2.

The lamp holder means 33 preferably includes a lock means 57 for selectively preventing movement of the first and second extension members 43, 49 relative to one another. The lock means 57 may consist simply of a screw 59 or the like adapted to pass through a threaded aperture 61 in the first extension member 43 adjacent the second end 47 thereof and adapted to screw against the second extension member 49 adjacent the second end 53 thereof (see, in general, FIG. 4) to thereby fixedly attach or lock the first and second extension members 43, 49 relative to one another in a manner as will now be apparent to those skilled in the art.

The lamp holder means 33 is preferably calibrated to allow the location of the lamp 17 within the interior 21 of the housing member 19 to be accurately adjusted or located. More specifically, the lamp holder means 33 preferably includes indicia means 67 for indicating the relative positions of the first and second extension members 43, 49 to allow the relative position of the lamp 17 with respect to the lens 23 and associated structure to be accurately calibrated. The indicia means 67 preferably includes indicia marks 69 provided on the second extension member 49. The indicia marks 69 may consist merely of grooves or the like formed in the outer surface of the second extension member 49 and spaced apart from one another whereby the relative position of the lamp within the interior 21 of the housing member 19 is indicated by observing which indicia mark 69 the second end 47 of the first extension member 43 is aligned. It should be noted that the relative position of the lamp 17 within the interior 21 of the housing member 19 determines the angle of the light beam or signal produced by the light 11. More specifically, the lamp 17 is preferably normally adjusted to produce a light beam or signal at 4° above horizontal. This is usually the most optimum setting. However, this setting can easily be readjusted to fit any particular situation by merely loosening the screw 59 and either lowering or raising the second extension member 49 relative to the first extension member 43 and then re-tightening the screw 59. It should be noted that the exact amount of movement to change the light beam one or more degrees relative to the horizontal depends on the structure of the components of the optical system as will be apparent to those skilled in the art. The indicia marks 69 may be spaced apart from one another a distance substantially equal to the distance necessary to move the light beam 1° relative to the horizontal.

Figure 5:
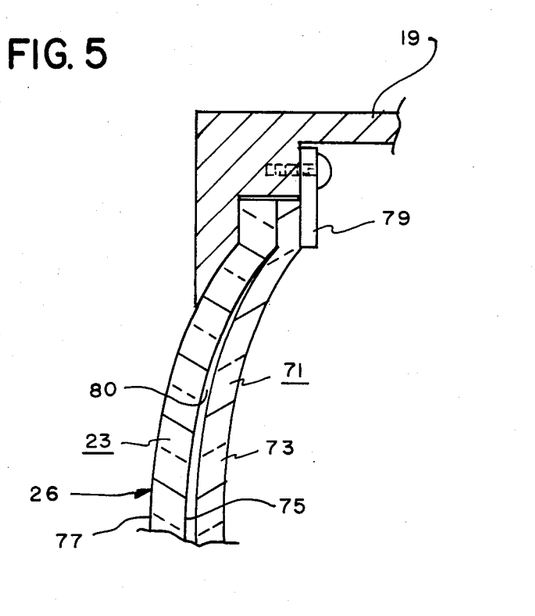
FIG. 5 is an enlarged sectional view of another portion of the beacon light of FIG. 2.
Figure 6:
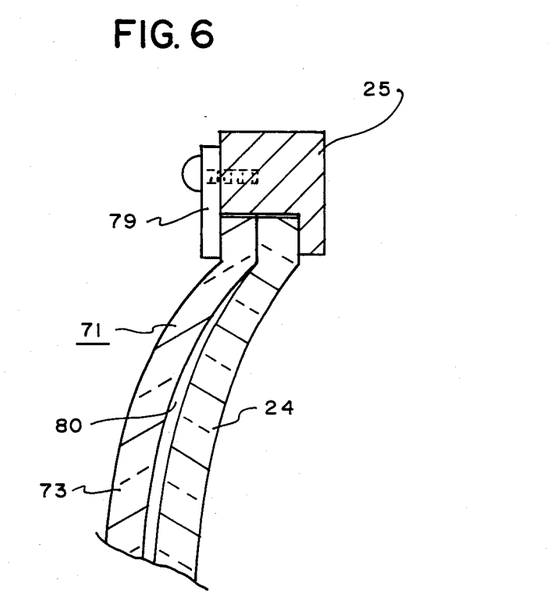
FIG. 6 is an enlarged sectional view of portion of the beacon light of FIG. 1.

The light 11 preferably includes color correcting means 71 mounted adjacent the lens 23 for correcting the color of the light produced by the lamp 17 through the lens 23. The color correcting means 71 preferably includes a transparent auxiliary lens member 73 positioned on one side of the lens 23. Thus, the lens 23 preferably has an interior side 75 and an exterior side 77 and the auxiliary lens member 73 is preferably mounted adjacent the interior side 75 of the lens 23. The auxiliary lens member 73 is preferably constructed of transparent green thermoplastic such as, for example, one-eighth inch thick No. 2414 green "plexiglass" by a heating and blowing process to form a bubble to a dimension and size so as to completely blanket the interior side 57 of the lens 23. The auxiliary lens member 73 may be fixedly attached directly to the lens 23 by clips 79 or the like as shown in FIGS. 2 and 5 or may be attached a spaced distance from the lens 23 by the clips 79 as shown in FIGS. 1 and 6. More specifically, in the single head, double beacon type unit as shown in FIGS. 1 and 6, the auxiliary lens member 73 is preferably attached to the color coding doublet lens 24 that is positioned between the lamp 17 and lens 23 as will be apparent to those skilled in the art. While in the double head, double beacon type unit shown in FIGS. 2 and 5, the auxiliary lens member 73 is preferably attached to the color coding lens 26. In either case the auxiliary lens member 73 is preferably constructed so as to have an open air space 80 between the lens member 73 and the doublet lens 24 or the lens 26 to provide a heat insulating barrier.

Figure 7:
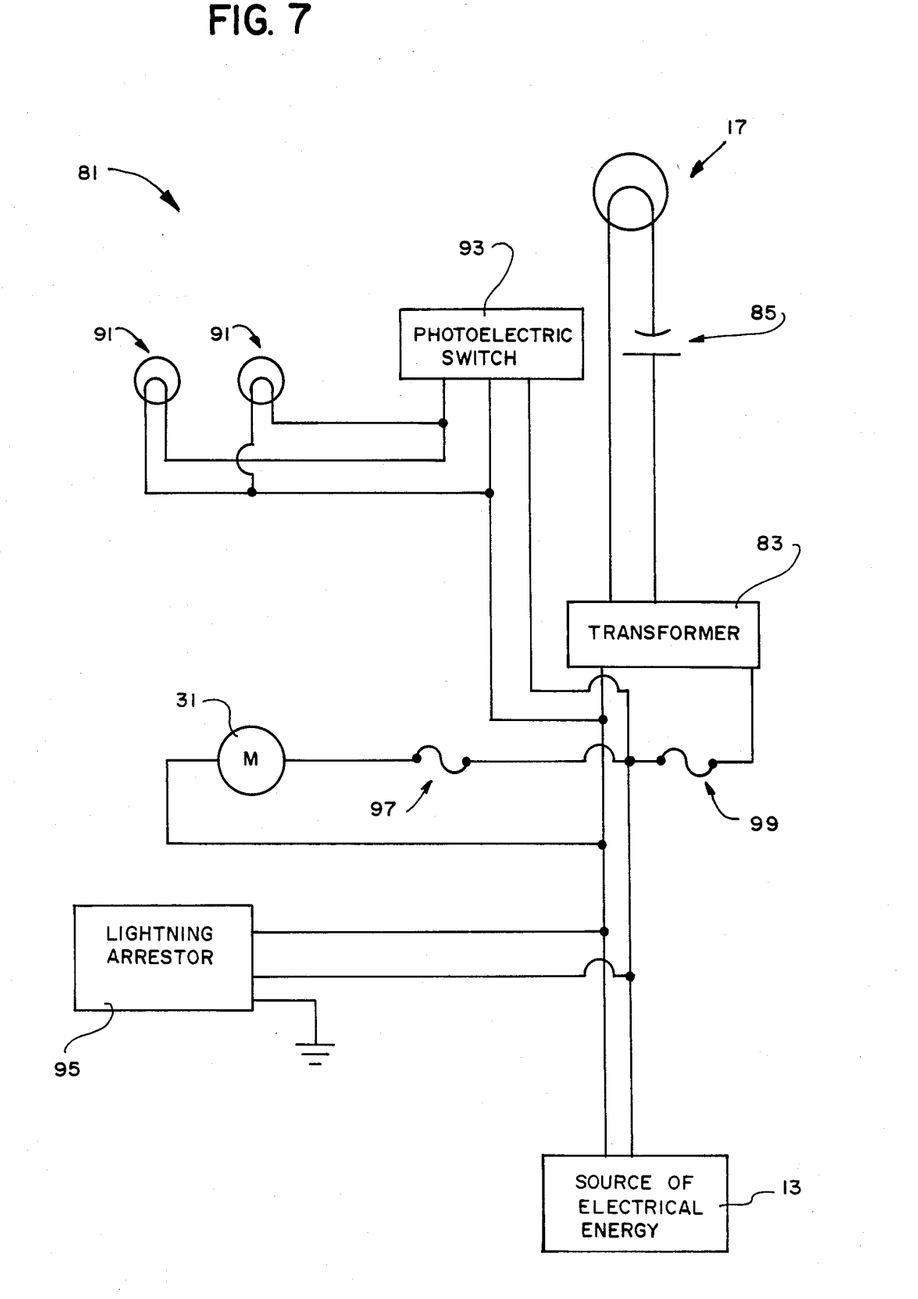
FIG. 7 is a diagrammatic schematic view of the various electrical components of the beacon light of the present invention.

The light 11 includes circuit means 81 for electrically coupling the lamp 17 to the source 13 of electrical energy (see FIG. 7). The circuit means 81 preferably consists of typical electrically conductive wires extending between the lamp 17 and source of electrical energy 13 and may include a transformer 83 and a capacitor 85 mounted within the interior 21 of the housing member 19. The transformer 83 and capacitor 85 may be constructed as a unit such as the model number 1130-93-R500K manufactured by Universal Mfg. Corp. of Paramus, N.J. A heat shield means 87 is preferably mounted in the interior 21 of the housing member 19 for shielding the transformer 83 from heat generated by sunlight or the like (e.g., from heat generated by the magnification of sunrays through the optical system). The heat shield means 87 may include a metal bracket member 89 fixedly attached relative to the housing member 19 within the interior 21 thereof (see FIG. 4). The transformer 83 and capacitor 85 may, in turn, be attached to the bracket member 89 whereby the bracket member 87 serves as both a heat shield and an attachment means. It should be noted that the heat shield/bracket structure may be modified depending on the specific structure of the housing member 19 and may be constructed in two or more separate pieces.

The light 11 may include one or more obstruction light means 91 fixedly mounted relative to the housing member 19 for providing an obstruction marker light. Thus, the light 11 may include one or more obstruction light means 91 fixedly mounted at spaced locations on the support tower 15 as shown in FIGS. 1 and 2, or directly to the housing member 19, etc., to provide a clear indication of the support tower 15 and housing member 19 especially if the lamp 17 fails to operate. Such obstruction light means 91 are well known to those skilled in the art and are coupled to the circuit means 81 in a manner so as to be electrically coupled to the source 13 of electrical energy. The present invention preferably includes a photoelectric switch means 93 positioned within the interior 21 of the housing member 19 (see FIG. 4) and coupled to the circuit means 81 for breaking the circuit between the source 13 of electrical energy and the obstruction light means 91 when the lamp 17 is producing light. The photoelectric switch means 93 may be attached to the bracket member 89 and may consist of any typical unit well known to those skilled in the art such as the model number 2101 manufactured by Tork of Mt. Vernon, N.Y. Thus, the light produced by the lamp 17 within the interior 21 of the housing member 19 will be sufficient to open the photoelectric switch means 93 thus resulting in additional energy savings since the obstruction light means 91 are not necessary when the lamp 17 is operating. The photoelectric switch means 93 is preferably attached to the bracket member 89.

A lightning arrestor 95 of any well-known construction is preferably coupled to the circuit means 81 for protecting the circuit means 81. Delta Lightning Arrestors, Inc. of Big Spring, Tex. manufactures such units.

Additionally, the circuit means 81 is preferably provided with a first fuse 97 for protecting the motor means 31 and a second fuse 99 for protecting the lamp 17 and associated lighting circuitry as shown in FIG. 7. Typical slip rings, terminal blocks and the like (not shown) are also provided as will be apparent to those skilled in the art to ensure proper transmission of electrical energy from the source 13.

Additionally, it should be noted that all exposed electrical wires preferably consist of "Teflon" high temperature wire or are sleeved with heat resisting sleeves in any manner now apparent to those skilled in the art.

It should also be noted that the need for the color correcting means 71 is due to the change from the prior incandescent lamp to the metal halide lamp of the present invention. That is, the typical color coding means 24, 26 of a beacon is normally coded to be used with a 1000 watt incandescent lamp and thus needs to be corrected when a 400 watt metal halide lamp is used.

Although the present invention has been described and illustrated with respect to a preferred embodiment thereof and a preferred use therefor, it is not to be so limited since changes and modifications can be made therein which are within the full intended scope of the invention.

I claim:

1. An airport beacon light for use with a source of electrical energy, said light comprising, in combination:
   (a) a lamp;
   (b) a hollow housing member including a lens;
   (c) lamp holder means positioned within the interior of said housing member for holding said lamp in a specific location relative to said lens, said lamp holder means including a base member fixedly attached to said housing member within the interior thereof and including a lamp socket member for removably holding said lamp, said lamp socket member being adjustable relative to said base member for allowing the position of said lamp relative to said lens to be adjusted;
   (d) circuit means for electrically coupling said lamp to said source of electrical energy, said circuit means including a transformer and a capacitor mounted within the interior of said housing member; and
   (e) a heat shield means mounted in the interior of said housing member for shielding said transformer from heat generated by sunlight, said heat shield means including a bracket member fixedly attached relative to said housing member within the interior thereof, said transformer and said capacitor being attached to said bracket member.

2. The light of claim 1 in which is included obstruction light means fixedly mounted relative to said housing member for providing an obstruction marker light, said circuit means electrically coupling said obstruction light means to said source of electrical energy.

3. The light of claim 2 in which is included a photoelectric switch means positioned within the interior of said housing member and coupled to said circuit means for breaking the circuit between said source of electrical energy and said obstruction light means when said light lamp is producing light.

4. The light of claim 3 in which said photoelectric switch means is attached to said bracket member.

* * * * *